United States Patent [19]

Simons

[11] 4,343,770

[45] Aug. 10, 1982

[54] SELF-REGENERATING SYSTEM OF REMOVING OXYGEN AND WATER IMPURITIES FROM HYDROGEN GAS

[75] Inventor: Harold M. Simons, Orem, Utah

[73] Assignee: Billings Energy Corporation

[21] Appl. No.: 128,246

[22] Filed: Mar. 7, 1980

Related U.S. Application Data

[62] Division of Ser. No. 861,895, Dec. 19, 1971, Pat. No. 4,216,198.

[51] Int. Cl.³ .......................... B01J 8/04; B01J 12/00; F17C 11/00; F17C 13/00
[52] U.S. Cl. .......................... 422/112; 123/DIG. 12; 206/0.7; 422/191; 422/212; 422/223
[58] Field of Search ............... 422/112, 190, 191, 212, 422/223, 242, 200, 202, 208; 206/0.7; 123/3.1 A, DIG. 12; 423/248, 648 R, 644

[56] References Cited

U.S. PATENT DOCUMENTS

| | | | |
|---|---|---|---|
| 3,174,833 | 3/1965 | Blackmer | 422/112 |
| 3,179,500 | 4/1965 | Bowen et al. | 422/112 |
| 3,451,783 | 6/1969 | Collins | 422/111 |
| 3,969,481 | 7/1976 | Murray et al. | 423/248 |
| 4,016,836 | 4/1977 | MacKay et al. | 123/3 |
| 4,108,605 | 8/1978 | Billings | 422/223 |
| 4,183,369 | 1/1980 | Thomas | 206/0.7 |

Primary Examiner—Bradley Garris
Attorney, Agent, or Firm—Thorpe, North, & Western

[57] ABSTRACT

Oxygen and water impurities are cleaned from hydrogen, which is to be stored in tanks containing a hydride-forming metallic alloy, using a novel, self-cleaning filter system. The impurity-containing hydrogen gas is first passed through a catalyst bed comprising a catalyst which is adapted to convert oxygen in the presence of hydrogen to water. The gas then passes through an adsorbent capable of adsorbing water from the gas stream, thereby substantially removing water impurities from the hydrogen gas. The purified hydrogen gas is charged into a storage tank containing a hydride-forming metallic alloy which absorbs the hydrogen by reacting therewith to form hydrogen-loaded metallic hydride. When the storage tank is to be discharged, the hydrogen-loaded metallic hydride in the tank is treated to release hydrogen gas therefrom. The released gas is passed back through the adsorbent, thereby cleaning the adsorbent of water impurities deposited therein when the tank was being charged with hydrogen. The hydrogen gas containing water impurities is then forwarded to a hydrogen utilization unit for further use of the hydrogen.

3 Claims, 2 Drawing Figures

SELF-REGENERATING SYSTEM OF REMOVING OXYGEN AND WATER IMPURITIES FROM HYDROGEN GAS

This is a division of application Ser. No. 861,895, filed Dec. 19, 1971, now U.S. Pat. No. 4,216,198.

BACKGROUND OF THE INVENTION

1. Field

The invention pertains to cleaning water and oxygen impurities from hydrogen gas which is to be stored in tanks containing a hydride-forming metallic alloy. The water and oxygen impurities, if left in the hydrogen, would have a detrimental effect on the hydride-forming metallic alloys in the storage tanks.

2. State of the Art

Because of the abundance of hydrogen and its relatively pollution-free burning qualities, the desirability of developing hydrogen as an energy source has long been recognized. A major obstacle or drawback in utilizing hydrogen thus far has been the difficulty of efficiently and safely storing hydrogen. Storing hydrogen as a liquid is costly since it requires considerable energy to liquify the hydrogen, and transfer of the liquid from one container to another results in a loss to the atmosphere of much of the hydrogen. Also, containers for the liquid hydrogen must be extremely well insulated to reduce the loss of hydrogen due to vaporization or boiling. Storing hydrogen as a gas requires extremely heavy and bulky containers and is impractical for most presently contemplated uses.

The use of hydride-forming metallic reactant (hereinafter defined to mean any metals, metal compounds or alloys reacting with and thereby capable of absorbing hydrogen) appears to be an attractive approach to the storage of hydrogen. Exemplary hydride-forming metallic reactants include alloys comprising at least two elements selected from the group consisting of iron, titanium, nickel, calcium, magnesium, manganese, and rare earth elements. Particularly advantageous alloys include iron-titanium, lanthanum-nickel, calcium-nickel, manganese-nickel, mischmetal-nickel, and mischmetal-calcium-nickel alloys. Storage of hydrogen in the hydride-forming reactant, i.e., forming hydrides in a process which is sometimes referred to as hydriding, typically involves applying hydrogen gas under pressure of from about 150 to 1,000 psia to the material while dissipating the heat generated by the hydride-forming reaction. After the reactant reacts with and absorbs the hydrogen, the container is sealed under pressure to maintain the reactant in the "hydrided" state until the hydrogen is needed for subsequent use. Discharging hydrogen from the storage tanks involves a process substantially opposite that used for storing the hydrogen, i.e., releasing some of the pressure on the tank in which the hydride is contained. The discharge rate of hydrogen can be increased by heating the hydride in the tank.

Hydride-forming reactants presently contemplated for use in storing hydrogen not only react with and absorb hydrogen but also react with and absorb water vapor and oxygen, which are generally present with commercial sources of hydrogen. These impurity gases form much more stable bonds with the metallic reactant than does hydrogen, and whereas hydrogen can be regenerated by lowering the pressure and/or heating the reactant, oxygen and water cannot. Ultimately, the reactant will react with and absorb sufficient oxygen and water during successive cycles of storing hydrogen containing such impurities, that the reactant becomes unsuitable for storing hydrogen.

3. Objectives

One of the principal objects of the present invention was to provide an efficient system for purifying hydrogen gas of oxygen and water prior to charging the hydrogen gas to storage tanks containing a hydride-forming metallic, reactant. A further object of the invention was to provide a system which was self-regenerating, i.e., that upon discharge of hydrogen from the storage tank, the system would regenerate or reactivate itself so as to be capable of removing oxygen and water impurities from succeeding charges of hydrogen containing such impurities.

SUMMARY OF THE INVENTION

In accordance with the invention, the above objectives are achieved by cleaning the hydrogen gas of oxygen and water impurities with a novel, self-cleaning filter system. The impurity-laden hydrogen gas is passed through a porous bed of catalyst which is adapted to convert oxygen to water in the presence of the hydrogen. The catalyst can be selected from the group consisting of platinum, palladium, and nickel. The temperature and pressure of the hydrogen gas stream during the catalyst contact are not critical, and, advantageously, temperatures and pressures are adapted to interface with the subsequent steps in the process of the present system.

Following its contact with the bed of catalyst, the hydrogen gas is passed through a porous bed of an adsorbent which is capable of adsorbing water therefrom, to substantially remove all water impurities from the hydrogen gas, including the water formed in the preceeding catalyst contact step. The temperature of the gas as it passes through the bed of adsorbent is not critical; however, as most of the adsorbents available for use in this step function more effectively at moderate temperatures or lower, the temperature of the gas passing through the bed of adsorbent is preferably no greater than about 50° C. The pressure of the gas passing through the bed of absorbent is at least about 150 psia. Advantageously, the pressure of the gas is commensurate with the pressure used in charging the hydrogen gas to the storage containers, i.e., typically from about 200 to 1000 psia.

The purified hydrogen gas coming from the bed of adsorbent is introduced into a storage tank which contains a hydride-forming, metallic reactant capable of absorbing hydrogen by reacting therewith to form hydrogen-loaded metallic hydride. Applicable hydride-forming, metallic reactants are well known in the art, and a number of exemplary reactants have been recited hereinabove.

When all the available hydrogen has been charged to the storage tank, or when the capacity of the storage tank has been achieved, the flow of hydrogen gas is discontinued. The tank is valved closed, and hydrogen in the tank is maintained under pressure in the "hydrided" state until it is to be withdrawn for subsequent use.

When hydrogen is to be withdrawn from the tank, the metallic reactant in the tank is treated to release the hydrogen absorbed therein. The released hydrogen is withdrawn from the tank and passed back through the bed of adsorbent in reverse direction to the flow of gas therethrough when the storage tank is being charged with hydrogen.

As the released hydrogen gas backflows through the adsorbent, water is desorbed from the adsorbent and released to the flow of hydrogen, thereby cleaning the adsorbent of the water which is adsorbed during the previous step of charging hydrogen to the storage tank. For effective cleaning of the water from the adsorbent, the pressure of the backflow of hydrogen must be less than the pressure at which the hydrogen flowed forward through the adsorbent during the charging of the storage tank. It is preferable to maintain the pressure of the backflow of hydrogen at from about 15 to 100 psia, depending, of course, upon the particular adsorbent being used and the pressure of the forward flow of hydrogen during the previous charging of the storage tank. If the forward flow pressure was sufficiently high, say between about 400 and 1000 psia, then backflow pressures in the upper range, e.g., up to 100 psia, can be used while still obtaining effective cleaning of the adsorbent. With forward flow pressures of between about 150 and 400 psia, depending upon the particular adsorbent used, it may be necessary to utilize backflow pressures less than 100 psia to obtain effective cleaning of the adsorbent.

The released hydrogen, following the backflow thereof through the bed of adsorbent, contains water impurities; however, such impurities have very little to essentially no effect on almost all subsequent processes and other uses for which the hydrogen may be employed. Thus, the hydrogen gas from the bed of adsorbent can ordinarily be forwarded to a hydrogen utilization unit without concern of the water content thereof. Of course, the hydrogen can be dried at the utilization unit prior to its use therein if such is desired; however, that is beyond the scope of and forms no part of the present invention. Further, the hydrogen utilization unit itself forms no part of the present invention, and for purposes of describing the present invention, it is sufficient to note that the hydrogen utilization unit could be any unit which uses or stores hydrogen, including a chemical plant which uses hydrogen as a reagent or raw product, a hydrogen fueled engine, other devices designed to burn hydrogen, another storage tank, etc.

THE DRAWING

Particular embodiments of the present invention representing the best mode presently contemplated of carrying out the invention are illustrated in the accompanying drawing, in which:

FIG. 1 is a schematic diagram showing the self-cleaning filter used in the hydrogen fuel system of an internal combustion engine which is designed to operate on gaseous hydrogen fuel, and FIG. 2 is a schematic vertical elevation of a hydrogen storage system in accordance with the invention.

DETAILED DESCRIPTION OF THE ILLUSTRATED EMBODIMENTS

Figure 1:
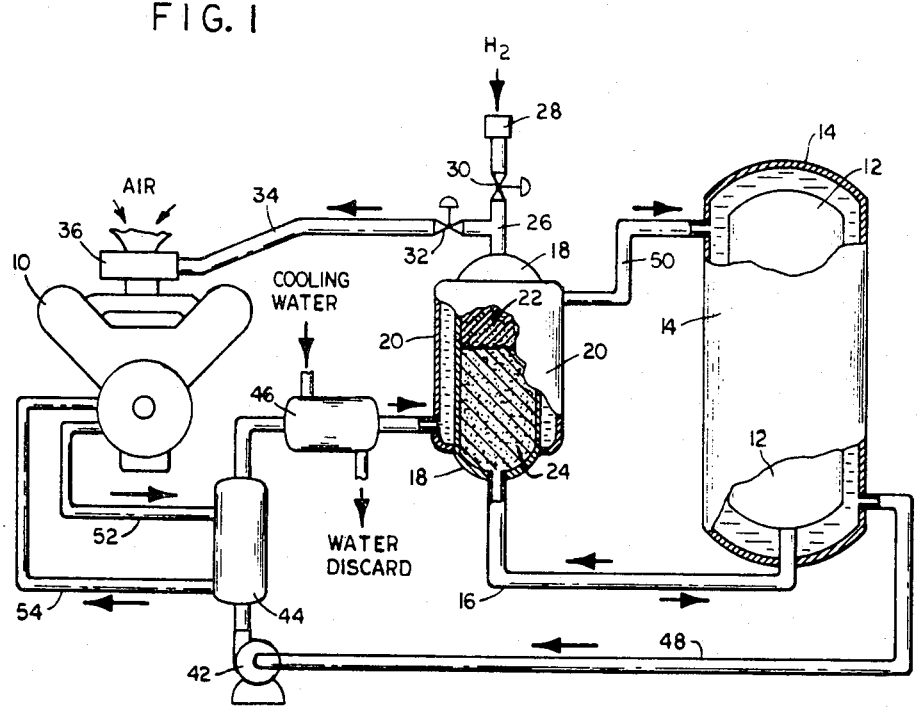
Figure 2:
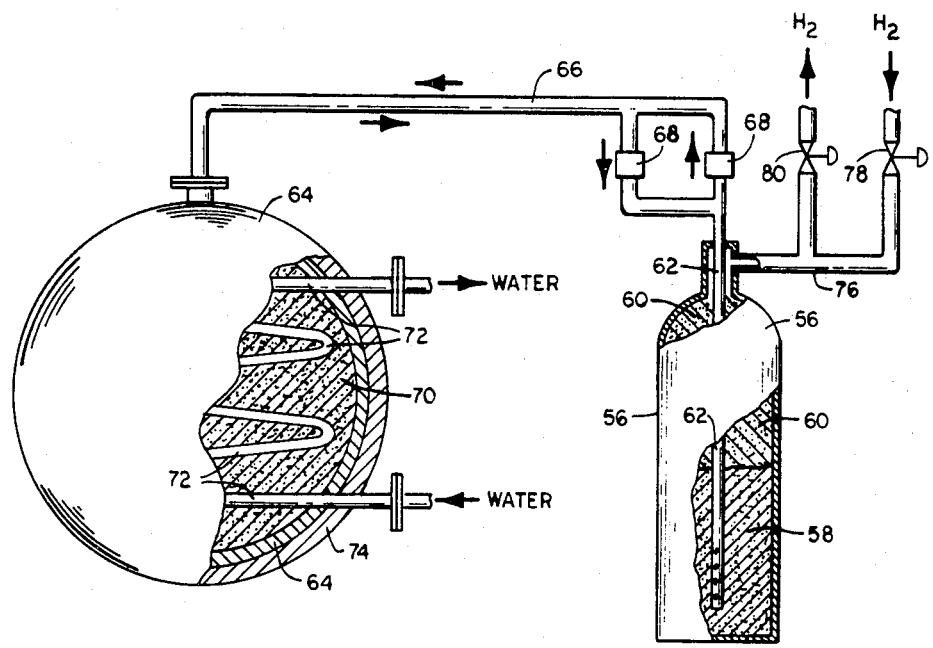

The method and system of the present invention can be utilized in substantially any type of application in which hydrogen is to be stored in storage tanks containing a hydride-forming metallic reactant. As illustrated in FIG. 1, the invention is incorporated into the fuel system of an internal combustion engine which uses gaseous hydrogen as its fuel. In FIG. 2, the invention is shown being used in a hydrogen storage system in which the hydrogen can be delivered to various hydrogen utilization units, such as hydrogen burners (either catalytic or flame type), chemical units which use hydrogen as a reagent, carrier gas, or raw starting material, another storage tank, or any device which utilizes hydrogen.

In the fuel system shown in FIG. 1, an internal combustion engine 10 is adapted to operate with gaseous hydrogen as the fuel. The fuel system for the engine 10 comprises a storage tank 12 which is enclosed by a water jacket 14. The storage tank 12 is filled with a hydride-forming, metallic reactant which absorbs hydrogen by reacting therewith to form hydrogen-loaded metallic hydride. The metallic reactant includes any of the metals or alloys mentioned hereinbefore as useful for this purpose. Preferred reactants, as presently contemplated, consist of one or more of the alloys selected from the group consisting of iron-titanium, lanthanum-nickel, calcium-nickel, and mischmetal-calcium-nickel.

A hydrogen conduit 16 connects the storage tank 12 and filter unit 18 in flow communication with each other, so that hydrogen gas can flow from the filter unit 18 to the storage tank 12 and vice-versa. The filter unit 18 has a water jacket 20 substantially surrounding it. The filter unit 18 is divided into two sections. The upper section is filled with a porous bed of catalyst material 22 which is capable of converting oxygen in the presence of hydrogen to water. Exemplary catalyst material includes platinum, palladium and nickel. The lower section of filter unit 18 is filled with a porous bed of adsorbent 24 which is capable of adsorbing water from the hydrogen stream passing therethrough. The adsorbent is selected from the group consisting of molecular sieves, alumina, charcoal, and silica gel. The term molecular sieves is meant to include synthetic or natural zeolites which are capable of separating gaseous materials based on their molecular size and configuration. The conduit 16 connects the lower section, i.e., the adsorbent section, of filter unit 18 to the storage tank 12, and a hydrogen supply manifold 26 is connected to the upper section, i.e., the catalyst section, of filter unit 18 in flow communication therewith.

The manifold 26 has two connections. One connection has a valve 30 therein and is adapted to be connected to a supply of pressurized hydrogen for charging hydrogen to the storage tank 12. The other connection on the manifold 26 is connected through a valve 32 to the fuel line 34 which is in turn connected in flow communication with the hydrogen carburetor or mixer 36 on the engine 10. The carburetor 36 is adapted to mix hydrogen fuel with incoming air and feed the mixture to the manifold of the engine 10.

A water recirculation system is provided for supplying cooled or heated water to the water jackets 14 and 20. Cooled water is supplied when hydrogen is being charged to the storage tank 12, and heated water is supplied when hydrogen is being withdrawn from the storage tank 12 for utilization in the engine 10. The water recirculation system does not form part of the present invention, but is described herein because it is advantageous in combination with an internal engine used in an automobile. The water recirculation system includes a pump 42 which receives water through conduit 48 from water jacket 14 around the storage tank 12. The pump 42 pumps the water, in series, through heat exchangers 44 and 46, respectively, and to the water jacket 20 around filter unit 18. The water then flows through conduit 50 from jacket 20 back to jacket 14. The pump 42 is adapted to run on the electrical system of the engine 10 when the engine is in operation, as well as on an external supply of electricity when the storage tank 12 is being filled with hydrogen. Heated water from the cooling system of the engine 10 is supplied to heat exchanger 44 through conduit 52 and returned to the engine 10 through conduit 54 when the engine 10 is operating and hydrogen is being withdrawn from storage tank 12. Means are provided for supplying cooling water to heat exchanger 46 when the storage tank 12 is being filled with hydrogen. The cooling water from heat exchanger 46 is discarded.

The operation of the fuel system shown in FIG. 1 follows two separate cycles, depending on whether hydrogen is being charged to the storage tank 12, or whether hydrogen is being withdrawn from storage tank 12 for fuel in engine 10. During the charging of hydrogen to tank 12, the engine 20 is turned off. The valve 32 in fuel line 34 is closed, and a source of pressurized hydrogen is connected to the connector 28 on manifold 26. Cooling water is supplied to heat exchanger 46, and pump 42 is connected to an external source of electricity. Valve 30 in manifold 26 is opened and hydrogen flows through the catalyst bed 22 and then through the bed of adsorbent 24 in the filter unit 18. From the filter unit 18, the hydrogen flows through conduit 16 to storage tank 12 wherein it reacts with and is absorbed by the reactant in tank 12. The absorption of hydrogen in storage tank 12 results in the release of exothermic heat which is removed from the storage tank by the cooling water circulating through the water jacket 14 surrounding tank 12. Although the cooling of the filter unit 18 by the circulation of cooling water through water jacket 20 is not essential, it has been found that the adsorbent will absorb water at maximum efficiency when it is cooled. Cooling of the catalyst section of the filter unit has essentially no effect on the conversion of oxygen to water, and, thus, the water jacket 20 could be made to surround only the adsorption section of filter unit 18.

Any oxygen impurities in the hydrogen gas is converted to water as the gas flows through the porous bed of catalyst 22 in filter unit 18. Water impurities originally in the hydrogen gas and the water generated as the gas flows through catalyst 22 are adsorbed from the gas as the gas flows through the adsorbent 24 in filter unit 18. Thus, hydrogen gas, essentially free of oxygen and water impurities, is forwarded to the storage tank 12.

Upon the completion of charging the hydrogen gas to the storge tank 12, valve 30 in manifold 26 is closed, the external source of electricity to pump 42 is disconnected, and the hydrogen supply is removed from connector 28. The valve 32 in the fuel line 34 is opened, and the engine 10 can be operated.

When the engine 20 is in operation, hydrogen flows from the storage tank 12 through conduit 16, the filter unit 18, and the fuel line 34 to the carburetor 36. A pressure regulator is incorporated in the carburetor 36 or fuel line 34 to regulate the pressure at which the hydrogen is mixed with the air in carburetor 36. During the operation of engine 10, heated water from the engine cooling system is circulated through heat exchanger 44, and pump 42 operates from the engine's electrical system. Heated water then flows through the water jackets 20 and 14 which surround the filter unit 18 and storage tank 12, respectively. The heated water supplies sufficient heat to the reactant in the storage tank 12 to supply endothermic heat required in releasing hydrogen from the reactant. The hydrogen released from the reactant in the storage tank 12 flows back through the filter unit 18 at a substantially reduced pressure in comparison to the pressure used in charging the tank 12. Under the conditions of reduced pressure and increased temperature, the adsorbent 24 in the filter unit 18 releases water contained therein to the flow of hydrogen gas. Thus, the adsorbent 24 is cleaned and conditioned for subsequent use in removing water from hydrogen which is being charged to the storage tank 12.

Following backflow through the adsorbent 24, the released hydrogen flows through the catalyst section of filter unit 18 and then through fuel line 34 to the carburetor 36 of engine 10. The gas is mixed with air in the carburetor 36, and the mixture is subsequently burned in the cylinders of the engine 10. The water content of the hydrogen has no adverse effect on the operation of engine 10. In fact, injection of water with the hydrogen fuel has been shown to be beneficial (see U.S. Pat. No. 3,983,882).

The self-cleaning filter unit 18 provides hydrogen essentially free of oxygen and water to the storage tank 12. By positively eliminating the oxygen and water contaminants which are present in substantially all commercially prepared hydrogen, the operation of the metallic reactant is troublefree and can be continued over long periods of time. Conversely, if the oxygen and water were not removed from the hydrogen, the operation of the metallic reactant would be impaired, and the reactant would function effectively for much shorter periods of time.

A more generalized use of the present invention is shown in the hydrogen storage system illustrated diagramatically in FIG. 2 of the drawing. This storage system comprises a composite filter means consisting of an elongate, enclosed chamber having top, bottom, and side walls. As shown, the chamber is formed by the cylindrical container 56. The lower section of the chamber or container 56 is filled with a porous bed of adsorbent 58. The adsorbent 58 is the same material as the adsorbent 24 contained in the filter unit 28 of FIG. 1. The upper portion of container 56 is filled with a porous bed of catalyst 60. The catalyst 60 is the same material as the catalyst 22 contained in filter unit 18 of FIG. 1.

A dip-tube 62 extends through the top wall of the container 56, through the catalyst section, and at least through the major portion of the adsorbent section, with the open, lower end of the dip-tube being positioned within the container 56 and with the upper end of the dip-tube 62 being open to the outside of the container 56. The term "open lower end" is meant to encompass a series of openings in the portion of the dip-tube 62 positioned in the lower half of adsorbent 58 as well as or in addition to a single opening in the very end of the dip-tube 62.

The upper end of the dip-tube 62 is connected in flow communication with tank 64 by conduit 66. Conduit 66 includes two flow regulators 68 connected in parallel. One of the flow regulators allows fluid flow toward the tank 64 at pressures of from about 150 psia to about 1000 psia. The other flow regulator allows fluid flow from the tank 64 to the container 56 at pressures of from about 15 psia to 100 psia. The tank 64 is filled with a hydride-forming, metallic reactant 70. The reactant 70 is the same material as the reactant contained in the tank 12 of FIG. 1. A heat exchange tube 72 is disposed in tank 64, and means are provided for passing either cooled or heated water through tube 72. A layer of insulating material 74 can cover the tank 64 as shown.

Manifold means 76 is connected to the top of container 56 in flow communication with the bed of catalyst 60 therein. The manifold 76 has two connections therein. One of the connections is adapted to be connected to a supply of hydrogen having a pressure of from about 150 psia and 1000 psia. A valve 78 is provided in this connection to control the flow of hydrogen therein. The other connection is adapted to provide hydrogen at a pressure of from about 15 psia to 100 psia to a pipeline which delivers the hydrogen to a hydrogen utilization unit which is not shown in the drawing. A valve 80 is provided in this connection also.

The operation of the system shown in FIG. 2 follows two separate cycles, depending upon whether hydrogen is being charged or withdrawn from storage tank 64. When hydrogen is to be charged to the storage tank 64, the valve 80 is closed, a source of hydrogen is connected to the appropriate connector on the manifold 76, and the valve 78 in that connector is opened. Hydrogen flows through the manifold 76 and into the top of container 56. The hydrogen flows through the bed of catalyst 60 wherein any oxygen impurities in the hydrogen are converted to water. From the catalyst, the hydrogen flows through the bed of adsorbent 58, wherein water impurities contained in the hydrogen are adsorbed by the adsorbent. The purified hydrogen flows through dip-tube 62, flow regulator 68, and conduit 66 to storage tank 64, wherein it reacts with and is absorbed by the reactant 70. Exothermic heat of reaction and absorption is removed from the reactant 70 in storage tank 64 by circulating cooling water through the heat exchange tube 72. When the desired amount of hydrogen has been charged to the storage tank 64, the valve 78 is closed, thus sealing the hydrogen in tank 64.

During discharge of hydrogen from storage tank 64, heated water is circulated in the heat exchange tube 72, and valve 80 is opened allowing hydrogen to flow to wherever it is to be used. The pressure on the reactant 70 is lowered and hydrogen is released from the reactant. Transfering heat to the reactant 70 hastens the release of hydrogen therefrom. The released hydrogen flows through conduit 66, flow regulator 68, and dip-tube 62 into the bed of adsorbent 58 in container 58. The blackflow of hydrogen through the bed of adsorbent at a reduced pressure in comparison to the pressure employed during the changing of tank 64 results in the release of the adsorbed water to the backflow of hydrogen thus cleaning the bed of adsorbent 58 of the water which it collected during the charging of the tank 64. The released hydrogen then flows through the bed of catalyst, the manifold 76, and valve 80 into a pipeline which directs the hydrogen to its ultimate point of use.

A water jacket could be provided around tank 56 similar to the jacket 20 around unit 18 of FIG. 1, if desired, and the flow of water coming from tube 72 in tank 64 could then be circulated through that jacket to optimize the adsorption and release functions of the adsorbent 58. However, it has been found that in many applications, depending upon size of the equipment and the ambient conditions, external cooling and heating of the adsorbent 58 are unnecessary.

Whereas, this invention is described with respect to particular embodiments, it is to be understood that changes may be made therein and other embodiments constructed without departing from the novel inventive concepts set forth herein and in the claims which follow.

I claim:

1. A hydrogen storage system having a self-cleaning filter means for removing oxygen and water from hydrogen which is being charged to storage tanks containing a hydride-forming, metallic alloy, said system comprising:

(a) a composite filter means comprising a catalyst section containing a catalyst adapted to convert oxygen in the presence of hydrogen to water and an adsorption section containing an adsorbent adapted to adsorb water from hydrogen gas, said catalyst section and adsorption section being in flow communication with each other;

(b) a storage tank containing a hydride-forming metallic reactant which absorbs hydrogen by reacting therewith to form hydrogen-loaded metallic hydride, (c) flow communicating means connecting the adsorption section of the filter means with the storage tank for flow of hydrogen gas between the filter means and the storage tank, and (d) manifold means connected in flow communication with the catalyst section of the filter means, said manifold means adapted to deliver hydrogen gas to the catalyst section of the filter means when the storage tank is being filled and to accept hydrogen gas from the catalyst section of the filter means during discharge of the tank, whereby oxygen and water impurities are removed from the hydrogen gas being charged to the storage tank, oxygen being converted to water as the hydrogen passes through the catalyst section of the filter means and water being adsorbed by the adsorbent as the hydrogen passes through the adsorption section of the filter means, and whereby the water is cleaned from the filter as hydrogen is discharged from the storage tank;

the catalyst and the adsorbent in step (a) being contained in an enclosed chamber having top, bottom and side walls, with the adsorbent and the catalyst occupying the lower and the upper portions of the chamber, respectively; and the flow communicating means consisting of:

(1) a dip-tube extending through the top wall of the chamber, through the catalyst section, and at least through the major portion of the adsorption section so that the open, lower end of the dip-tube is positioned within the chamber and the upper end of the dip-tube is open to the outside of the chamber, and (2) coupling means connecting the upper end of said dip-tube to said storage tank for flow of hydrogen gas between the dip-tube and the storage tank; and manifold means being connected to the top of said chamber to be in flow communication with the top of the catalyst section of the filter means.

2. A system in accordance with claim 1, wherein the portion of the dip-tube located below about the middle of the adsorption section has a series of openings therein.

3. A system in accordance with claim 1, wherein said coupling means is equipped with a pair of flow regulators connected in parallel, with one flow regulator allowing hydrogen to flow from the filter means to the storage tank at high pressure, and the other flow regulator allowing hydrogen gas to flow from the storage tank to the filter means at a lower pressure.

* * * * *